Figure 1:
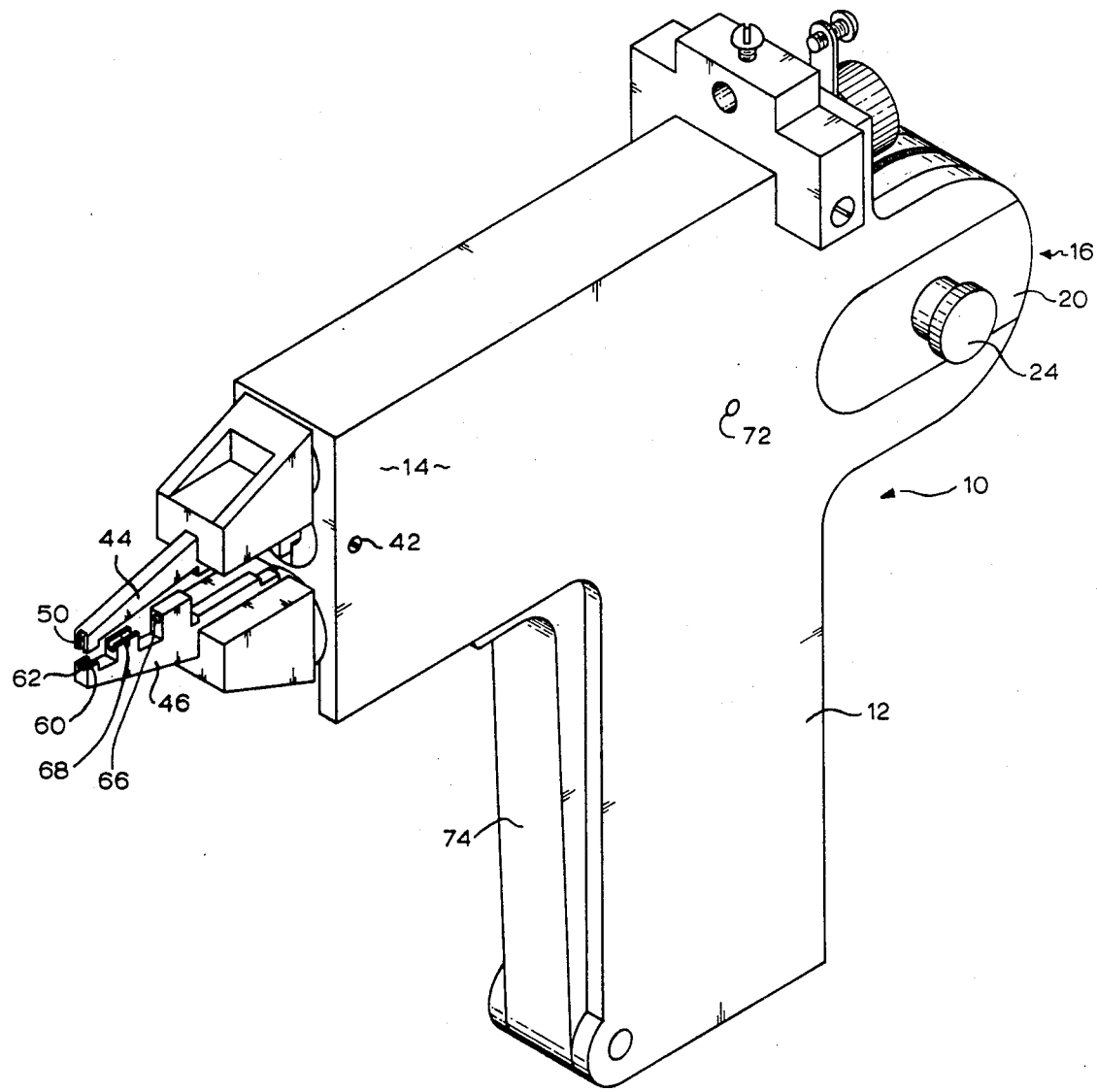

United States Patent

Crooks et al.

[11] 4,110,593
[45] Aug. 29, 1978

[54] WELDING GUN ADAPTED TO WELD MOVABLE CONTACTS ON WIRE SPRING RELAYS

[75] Inventors: Basil D. Crooks; R. Brian P. Bennett, both of Toronto, Canada

[73] Assignee: Northern Telecom Limited, Montreal, Canada

[21] Appl. No.: 791,861

[22] Filed: Apr. 28, 1977

[51] Int. Cl.² .............................................. B23K 11/10
[52] U.S. Cl. .................................... 219/90; 219/86.21
[58] Field of Search ................ 219/90, 85 F, 70, 103, 219/86.21

[56] References Cited

U.S. PATENT DOCUMENTS

| | | | |
|---|---|---|---|
| 2,110,271 | 3/1938 | May | 219/86.21 |
| 2,464,054 | 3/1949 | Panik | 219/90 |
| 2,651,701 | 9/1953 | Bacvien | 219/90 |
| 2,749,417 | 6/1966 | Griskew | 219/90 |

Primary Examiner—E. A. Goldberg

[57] ABSTRACT

A welding gun for replacing the movable contacts of wire spring relays is provided with a pair of jaws relatively movable toward each other to clamp the contact material to the relay arm for welding them together. A manual control member is movable to cause the relative movement over a resilient connection which provides the clamping pressure. The manual control member moves past the point in its travel where clamping is achieved stressing the resilient connection to actuate a switch to initiate the welding cycle. The clamping pressure is thus controlled at the time that welding commences.

4 Claims, 3 Drawing Figures

WELDING GUN ADAPTED TO WELD MOVABLE CONTACTS ON WIRE SPRING RELAYS

This invention relates to a welding gun for welding the movable contact on a wire spring relay.

The contacts on a wire spring relay burn out under use and it is desireable to replace such contacts in situ without the necessity of withdrawing the relay from its location for use.

The object of the invention is to provide a welding gun designed to clamp the new contact material to the wire of the relay arm for welding pressure but to provide that the pressure is a consistent predetermined amount when the welding cycle is initiated.

In accord with the invention a pair of welding jaws are designed to move relative to one another to clamp the replacement relay contact to the wire spring. A manually operable control member is provided to cause this relative movement. The connection between the manually operable control member and the jaws to cause such relative movement is such that, movement of the manually operable control member over an extent of movement moves one end of a spring. The spring is mounted to connect the manually operable control member to the jaws so that movement of such one end of the spring causes through the spring the jaws to move the clamping position. Continued movement of the clamping member in the same direction after the jaws have reached closed position causes the spring to be stressed to increase the clamping pressure on the jaws. At a predetermined extent of such continued movement the manual control member is caused to operate a switch to apply to the jaws, the welding current. Since the clamping pressure may be predetermined and is always the same at the point of application of the welding current, consistent results may be obtained with the welding gun in accord with the invention.

Figure 2:
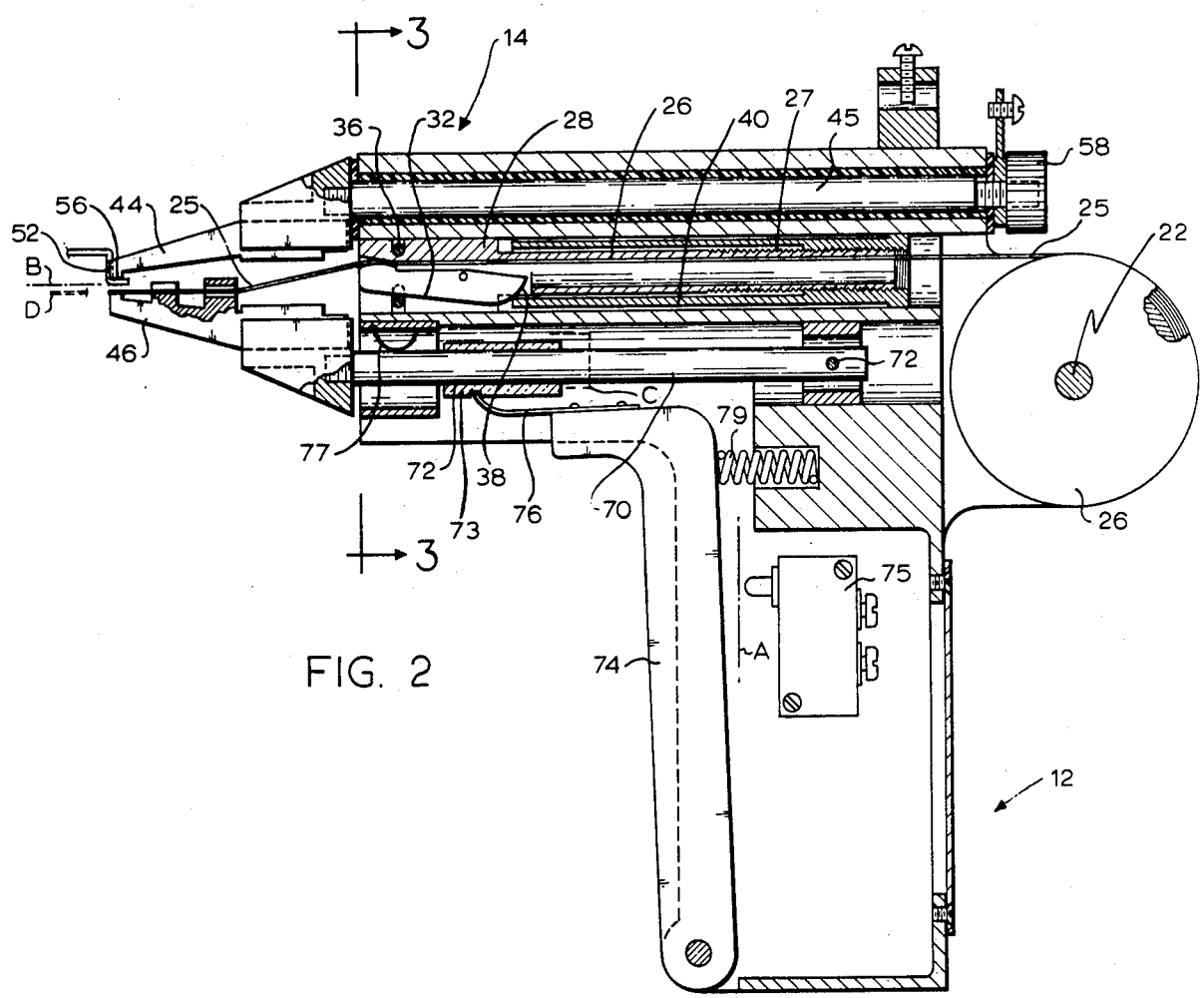

In drawings which illustrate a preferred embodiment of the invention:

In the drawings FIGS. 1 & 2 show a gun including a casing 10 designed to have a straight handle portion 12 a jaw mounting arm or "barrel" 14 extending forwardly from the upper end of handle portion 12 and a reel mount 16 projecting rearwardly from the upper end of handle portion 12.

Figure 3:
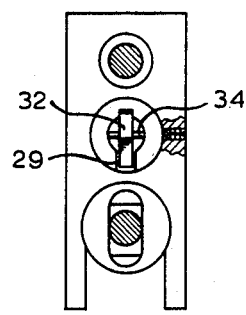

FIG. 3 shows a cross section along the line 3—3 of FIG. 2.

The reel mount 16 comprises rearwardly directed recesses on each side of the outer walls of the casing and a pair of plates 20 designed to be received in the respective recesses 18. A bolt 22 extends through the plates 20 and a nut 24 mounted on bolt 22 allows it to be tightened to clamp the plates 20 in the recesses. Rotatably mounted on the bolt 22 between the plates 20 is a reel 26 providing a groove on which the strip 25 of contact forming material is wound. The contact forming material is shown in FIG. 2 and comprises a base strip of palladium-silver alloy with a gold overlay. The base strip on the side opposite the overlay is formed with a bead which is the portion actually welded to the relay wire. The gold overlay forms the actual relay contact. The strip of contact forming material is led off the top and forwardly through a tension control which acts merely as a "drag" or tension control to the movement of the strip 25 from the reel to the forward portion of the gun.

This tension control may be of any desired form but the particular tension control used comprises a tubular member 26 with central bore 30 having at one end, threaded 27 at the outer wall and at the other end a cylindrical enlargement 28 is provided with a parallel sided radial slot 29 leading to the central bore 30 of the tube and to the forward end thereof. A parallel sided lever 32, dimensioned to be loosely slidable in the slot 29 is pivotally mounted in the slot 29 by pin 34 near the rearward end of the lever 32 to pivot toward and away from the opposed surface defining groove 30. A rubber annular O-ring 36 seats in a peripheral groove formed in the outer surface of the enlargement 28 and lever 32. The rubber O-ring acts to bias the inner forward edge of the lever 32 against the opposed surface defining bore 30 and to exert a predetermined maximum drag or tension on the strip 25 passing therethrough. The drag or tension is controlled by providing, on the rearward end of the lever 32 an inwardly rearwardly chamferred surface 38 which extends rearwardly of block 28. A sleeve 40 is designed to screw onto threading 27 and has its wall extending forwardly to contact the chamferred surface 38. Thus, with the lever biased inwardly by the O-ring against the strip 25, the pressure may be reduced by screwing the sleeve 40 to advance it forwardly so that the sleeve wall contacts the chamferred surface 38 of the lever 32 to depress the shank to the extent desired. Conversely rearward movement of the sleeve progressively releases the lever 32 to increase the drag or tension on the strip. The rearward end of the sleeve 40 is suitably notched, to permit screwdriver adjustment. The sleeve 40 and tube assembly is designed to be slid into a corresponding bore in the casing and setscrew 42 operable from the outside if the casing may be tightened to maintain the drag or tensioning device in the correct location and orientation. As previously stated, any equivalent (preferably adjustable) drag or tensioning device may be used.

The casing is provided with a bore extending out of the forward end of the casing to allow passage of the strip 25 from the forward end of bore 30. A pair of welding jaws are mounted on the forward end of the casing. These are referred to as fixed and movable jaws 44 and 46. The jaws are constructed of electrically conducting, non weldable material, such as copper. The fixed jaw 44 is mounted to extend outwardly from the casing to converge toward the movable jaw 46 and is provided at its outer end with a downwardly directed face 48 shaped to contact the "elbow" at the end of a movable contact arm of the relay of the type known as wire spring relay. The outer end of the jaw 44 is therefore provided with a groove 50 extending downwardly toward the other jaw to receive the extent 52 of the relay wire contact arm, while the contact face 54 is grooved to seat a portion of the tip 56 of the wire contact arm. It will be noted that the groove in the contact face 54 seats the tip 56 less than completely, since a portion of the thickness of tip 56 must project below the contact surface to allow it to be pressed against the strip 25. The fixed jaw 44 is mounted to be fixed against translating movement that the movable jaw 46 moves toward and away from it in the use of the tool. However the upper jaw may be mounted for rotational adjustment about an axis forward and rearward of the gun to allow its orientation to be fixed. As shown, this is achieved by mounting the jaw 44 on a long shank 45, extending through the casing to a threaded end projecting rearwardly of the casing on which end is provided a knurled nut 58 which may be tightened to clamp the fixed jaw 44 in the desired orientation.

The movable jaw 46 is provided at its outer end with a contact face 60 located to approach the corresponding contact face 54 of the fixed jaw member 44 and is provided with a shallow groove 62 extending in the tape extension direction, to partially receive the strip 25 with the gold contact surface in the root of the groove and the base outwardly thereof. As with the fixed jaw face the groove 62 for the tape in the movable jaw face 60 is shallow to cause a portion of the thickness of the strip member to project upwardly therefrom to allow clamping pressure to be exerted thereon to clamp the strip 25 against the wire contact arm tip 56 seated in jaw 46.

Between the contact face 60 and the tension device the movable jaw 46 is provided with alignment means for the strip 25 comprising a circular bore 66 in a projection from the movable jaw member and a deep groove 68 in another projection. These are to maintain alignment of the strip between the jaws and the tension member.

The movable jaw 46 is mounted on the end of a jaw mounting member comprising an arm 70 pivotted at 72 near the rear of the casing, the arm 70 being designed to be relatively long so that comparatively little change of orientation occurs in the moving jaw face 54 over its (small) extend of movement. The jaw 46 and arm 70 are provided with guides in the casing to guide their movement toward and away from the fixed jaw 44. The arm 70 mounting the movable jaw 46 is provided with a cam surface 72 extending substantially parallel to the arm 70 and the direction of strip movement. This cam surface is acted upon by a shoe 73 preferably of nylon, movable upward and downward (while sliding longitudinally along the surface 72) under the control of the trigger arm which will now be described. The movable jaw is preferably biased downwardly by a spring 77.

The handle portion of the casing is split to provide a forwardly directed opening between the side walls. A manually operable member comprising a trigger member is provided movable in such opening and between such walls and comprising an arm 74 pivotted to the casing at 76 near the lower end of both and arm 74 extends upwardly with a forward surface located forwardly of the forward edge of the casing handle walls to be moved rearwardly by the clasping of a hand about the handle portion and trigger.

The upward end of the trigger arm 74 projects forwardly and on the upper surface is attached, by any suitable method, a leaf spring 76 projecting forwardly, upwardly turned on its forward end and coupled on its upwardly turned forward end to the shoe 73 which slides along the cam surface 72 of the movable jaw arm. The shoe, on its surface which contacts the end of the leaf spring 76, is provided with a groove, as shown, on each side of the leaf spring to contact the end of the spring to cause the shoe 73 to translate with the spring 76. A micro switch 75 is mounted inside the casing to be contacted and operated by the trigger arm during the last 2°-3° of its movement toward a position perpendicular to arm 70. The arm 70 and jaw 46 are spring biased downwardly in any desired manner such as by leaf spring 77.

The arm 74, spring 76, shoe 73 and micro switch are so arranged that initial rearward movement of arm 74 from its rest position (i.e. greatest projection from the casing) moves arm 74 upward to cause the movable jaw to clamp the strip material against the wire arm. At this point the upper surface of the strip on the lower jaw is in position "B", the rear surface of arm 74 is at position A and the rearward end of the shoe 73 is at position "C". However when the arm 74 has moved sufficiently to achieve this clamping, it has not yet contacted the micro switch, it is preferably 2°-3° from a position of perpendicularity to arm 70 mounting the movable jaw. The arm 74 moves past the clamping position a short distance to actuate the micro switch, maintaining a nearly constant but slightly increasing clamping pressure over this short distance. The micro switch is connected to actuate welding current control (not shown) usually having means at a controlled start and over a controlled period. Welding current is during such period applied across the jaws which are connected to the control and insulated from each other (and to avoid harm to the operator) by means not shown but well known to those skilled in the art.

In operation, before use of the gun the micro switch is, of course, off with the trigger arm 74 forward, the elbow of the wire contract arm is nestled in the fixed jaw 44 as previously explained, with the contact arm tip 56 partially seated in the groove in face 54. The strip 25 is extended so that a portion thereof is partly seated in the groove 62 of the movable jaw 46, again as previously described. (Usually the tape is pulled too far through the jaaws say to position "D" and retracted by the reel until its end corresponds to the outer face of the jaws. The trigger arm 74 is then pulled moving the spring 76 accompanied by the shoe 73 rearwardly and upwardly until the arm 70 has moved upwardly sufficiently that clamping of strip 25 to wire contact arm tip 56 is achieved. The movement of these members is continued, to provide operation of the micro switch to initiate the welding operation. It will be noted that the leaf spring 76 provides the same clamping pressure on each welding operation and that this clamping pressure varies little between initial clamping and the time of operation of the micro switch. The position of the micro switch is preferably adjustable.

The initiation and duration of the weld consequent upon the operation of the microswitch is controlled by timing means not shown and well known to those skilled in the art.

When the weld is completed the trigger arm 74 is released and preferably is designed to move forward under the pressure of the spring 79. Movable jaw 46 is opened, by spring 77 or alternative spring biasing means. Consequently the micro switch is released and (from its design) allowed to reset and the movable jaw 46 opens. The gun may then be moved a slight distance away from the now welded relay wire and contact causing a short length of strip 25 to unwind from the reel to allow the insertion between the strip 25 and the contact of a cutting tool to cut the unused strip from that welded as the relay contact. The relay contact is ready for use. The strip may be retracted until its outer end corresponds to the outer end of the relay jaws ready to repeat the operation.

It will be seen that the spring 76 provides the flexible or resilient connection discussed in the introduction between the movable jaw 46 and the manually operable member here embodied by trigger arm 74. The spring 76 moves the movable jaw 64 under the control of trigger arm 74 until clamping is achieved and resiliently maintains (slightly increasing) the clamping pressure until the further movement (with the jaws then stationary) of the arm 74 operates the micro switch. Thus the flexible or spring connection between the manual operation and the movable jaw allows movement of the movable jaw, applies the clamping pressure and maintains this during the operation of the micro switch ensuring that the clamping pressure is the same for each operation of the gun.

We claim:

1. In a welding gun, a casing, a pair of jaws of electrically conducting, nonweldable material defining mutually facing surfaces, means on one of said surfaces to seat a wire of a relay leaving a surface of the wire displaced therefrom toward the surface of the other jaw, the other of said jaw surfaces being designed to seat a strip of material embodying the contact to be welded to said wire in a location to be clamped against said wire on the relative approach of said jaws, one of said jaws being mounted on a jaw mounting member, the other of said jaws being mounted for movement with said casing, said one jaw mounting member being mounted on said casing to move in a direction to cause said one jaw to move between a position to clamp said wire against said contact material between the two jaws, and a position more widely spaced from the other jaw, means releasably biassing said jaw mounting member toward the more spaced position, a control member manually movable over a range of movement, said control member and said jaw mounting member being arranged and directed so that on movement over said range in one direction said control member causes said jaw mounting member to move the jaw mounted thereon toward clamping relationship with the other jaw, a spring connection between said control member and said jaw mounting member whereby on movement of said control member in said one direction said control member causes said jaw mounting member movement over said spring until said clamping is achieved and thereafter movement of said control member a further distance in said one direction causes stress of said spring resulting in pressure of the jaw, which is mounted on the jaw mounting member, on the other jaw, and a switch for electrically energizing said welding jaws located and designed to be actuated on movement of said control member over said further range of movement.

2. In a welding gun, a casing, a pair of jaws of electrically conducting, non-weldable material defining mutually facing surfaces, one of said surfaces being designed to seat a wire forming the contact arm of a relay leaving a portion of the wire displaced therefrom toward the surface of the other jaw, the other of said jaw surfaces being designed to seat strip material embodying the contact to be welded to said wire in a location to be clamped against said wire on the relative approach of said jaws, one of said jaws being attached to a jaw mounting member, the other of said jaws being mounted on said casing for movement therewith, said jaw mounting member being mounted on said casing to move in a direction to cause such one jaw to move between a position to clamp said wire against said contact and a more spaced position, a control member mounted on said casing to move through a range of movement, a spring connection between said control member and said jaw mounting member arranged so that movement of said control member a predetermined amount in one direction over said range of movement moves said jaw mounting member to move said one jaw into clamping position by means of said clamping connection, and further movement of said control member in said one direction stresses said spring connection while maintaining said jaw in clamping position, said stressed spring causing clamping pressure of said one jaw toward the other jaw, and a electric contact located and designed to be closed by movement of said control means through said further movement.

3. In a welding gun, a casing, a pair of jaws of electrically conducting, non-weldable material defining mutually facing surfaces, said mutually facing surfaces being designed to clamp between them two members to be welded, one of said jaws being mounted for movement with said casing, the other of said jaws being mounted on a mounting lever, said mounting lever being swingably mounted on said casing to move over a range of movement between clamping position for the facing surface on said other of said jaws and a spaced position for said facing surface, means biasing said mounting lever to said spaced position, a control lever swingably mounted on said casing to move through a range of movement where it is roughly perpendicular to said control lever, a spring connection between said control lever and said mounting lever, said mounting lever, control lever and spring connection being arranged so that movement of said control lever in one direction moves said mounting lever into clamping position through stress on said spring connection and wherein said control lever is arranged to move a predetermined distance beyond that where said clamping position is reached, while maintaining said stress, a switch for controlling power for said gun operable by said control lever in movement over said predetermined distance.

4. In a welding gun, a casing, a pair of jaws of electrically conducting, non-weldable material defining mutually facing surfaces, said mutually facing surfaces being designed to clamp between them two members to be welded, one of said jaws being mounted for movement with said casing, the other of said jaws being mounted on a mounting lever, said mounting lever being swingably mounted on said casing to move over a range of movement between a spaced position for said facig surfaces and clamping position for said facing surfaces, means biasing said mounting lever to said spaced position, a control lever swingably mounted on said casing having a free end projecting toward said mounting lever, a spring projecting from said control lever designed to contact said mounting lever, said levers and said spring being so arranged that movement of said control lever over said range of movement stresses said spring to press said mounting lever into clamping position and maintains said pressure for movement of said control lever after said mounting lever has reached clamping position, switching means for controlling the application of power to said gun arranged to be switched by movement of said control lever after said mounting lever has reached clamping position.

* * * * *